No. 726,356. PATENTED APR. 28, 1903.
C. W. SCHOBER.
CAMERA.
APPLICATION FILED APR. 10, 1899.
NO MODEL. 5 SHEETS—SHEET 1.

No. 726,356. PATENTED APR. 28, 1903.
C. W. SCHOBER.
CAMERA.
APPLICATION FILED APR. 10, 1899.
NO MODEL. 5 SHEETS—SHEET 2.

No. 726,356. PATENTED APR. 28, 1903.
C. W. SCHOBER.
CAMERA.
APPLICATION FILED APR. 10, 1899.
NO MODEL. 5 SHEETS—SHEET 3.

Witnesses:
Geo. W. Young.
Chas. L. Goss.

Inventor:
Charles W. Schober,
By Winkler Flanders Smith Bottum & Vilas
C. W. Norweiss.

No. 726,356. PATENTED APR. 28, 1903.
C. W. SCHOBER.
CAMERA.
APPLICATION FILED APR. 10, 1899.
NO MODEL. 5 SHEETS—SHEET 4.
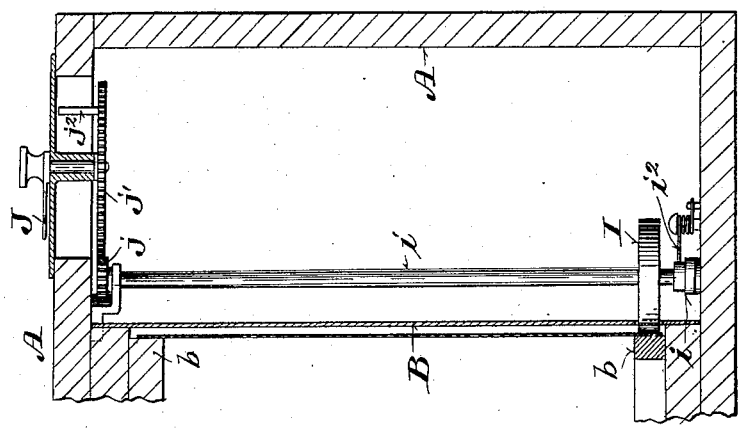
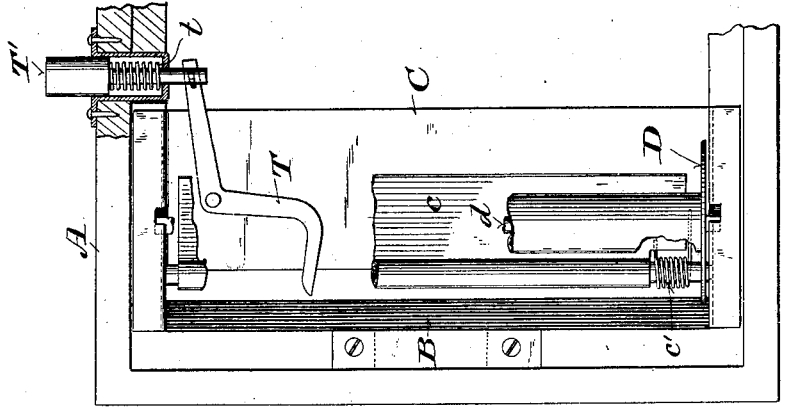
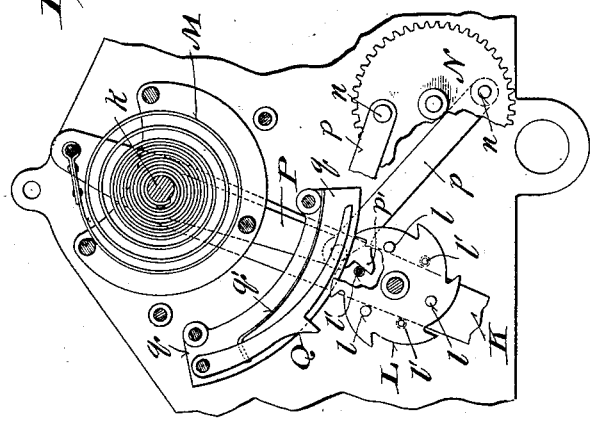
Witnesses:
Geo. W. Tonny
Chas. L. Goss
Inventor:
Charles W. Schober No. 726,356. PATENTED APR. 28, 1903.
C. W. SCHOBER.
CAMERA.
APPLICATION FILED APR. 10, 1899.
NO MODEL. 5 SHEETS—SHEET 5.

Witnesses:
Geo. W. Young
Chas. L. Goss

Inventor:
Charles W. Schober,

UNITED STATES PATENT OFFICE.

CHARLES WM. SCHOBER, OF BURLINGTON, WISCONSIN, ASSIGNOR TO EASTMAN KODAK COMPANY, OF ROCHESTER, NEW YORK, A CORPORATION OF NEW YORK.

CAMERA.

SPECIFICATION forming part of Letters Patent No. 726,356, dated April 28, 1903.

Application filed April 10, 1899. Serial No. 712,471. (No model.)

*To all whom it may concern:*

Be it known that I, CHARLES WM. SCHOBER, a citizen of the United States, residing at Burlington, in the county of Racine and State of Wisconsin, have invented certain new and useful Improvements in Cameras, of which the following is a specification, reference being had to the accompanying drawings, forming a part thereof.

My invention relates to panoramic cameras. Its main objects are to produce a picture by the movement of the lens-holder in either direction, to limit the movement of the lens-holder at different points for making exposures of different dimensions, to facilitate adjusting the camera for exposures of different dimensions and gaging the length of film unwound for such exposures, to vary the time of exposure, and generally to improve the construction and operation of cameras of this class.

It consists in certain novel features in the construction and arrangement of component parts of the camera, as hereinafter particularly described, and pointed out in the claims.

In the accompanying drawings like letters designate the same parts in the several figures.

Figure 1:
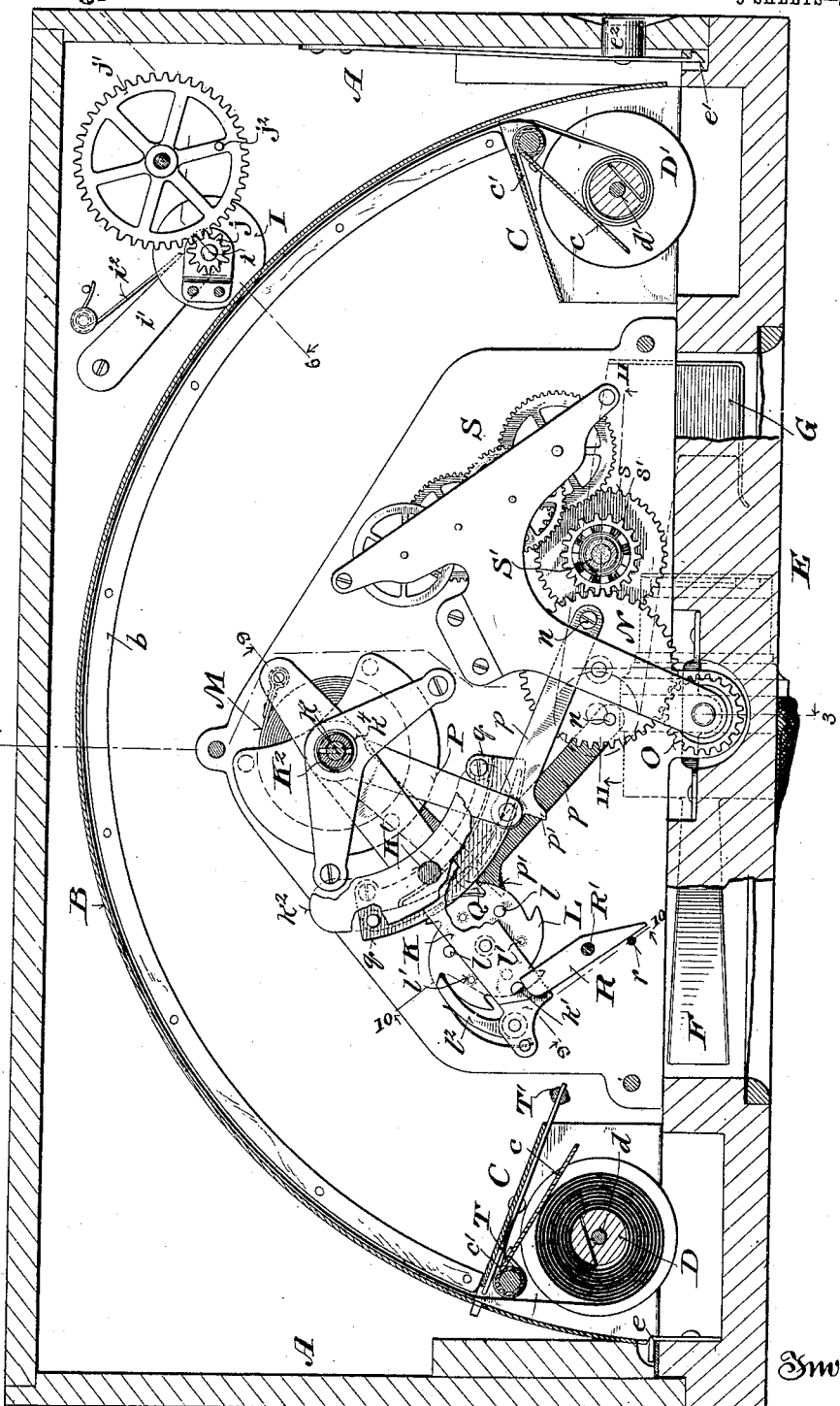
Figure 2:
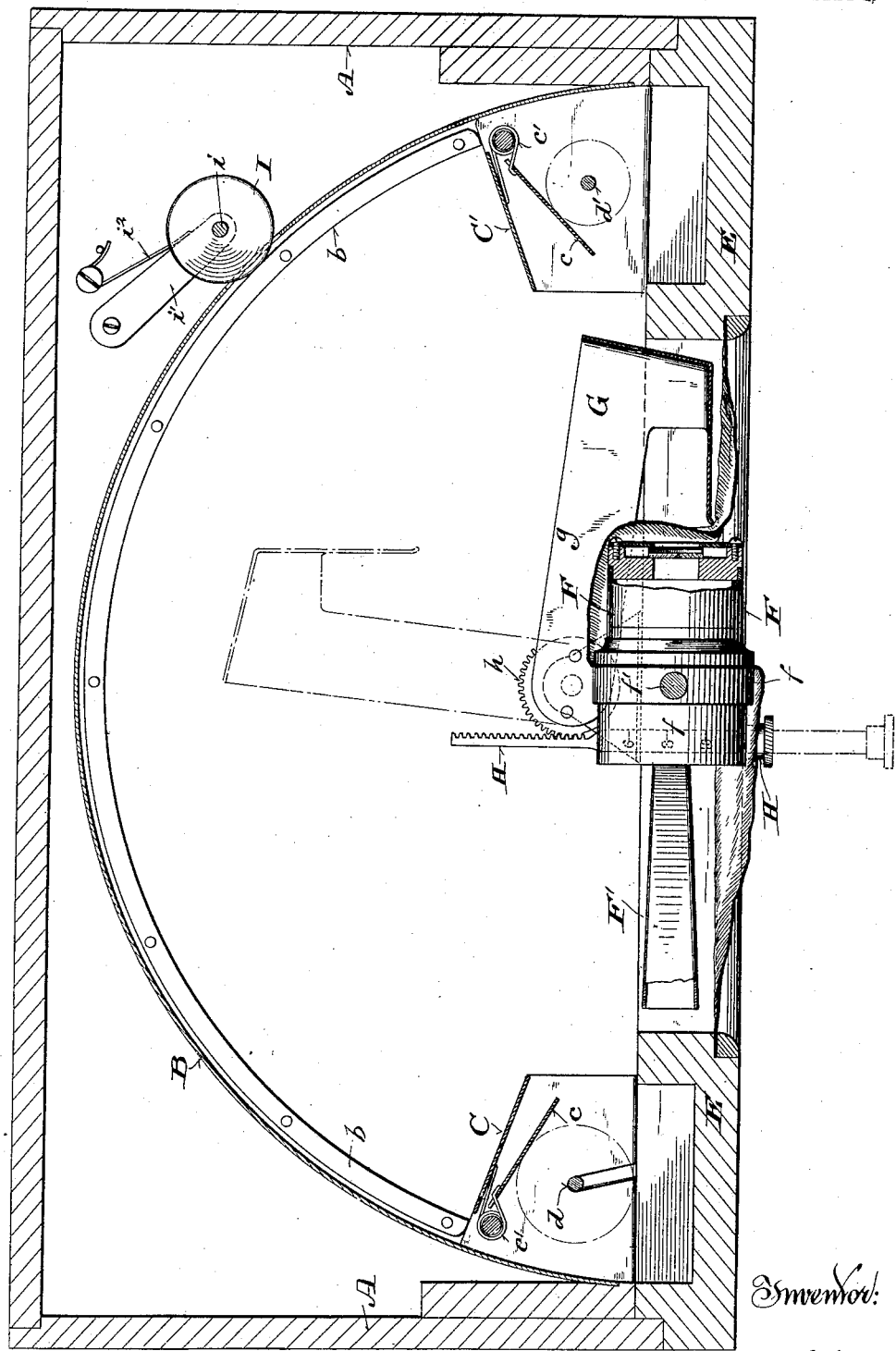
Figure 3:
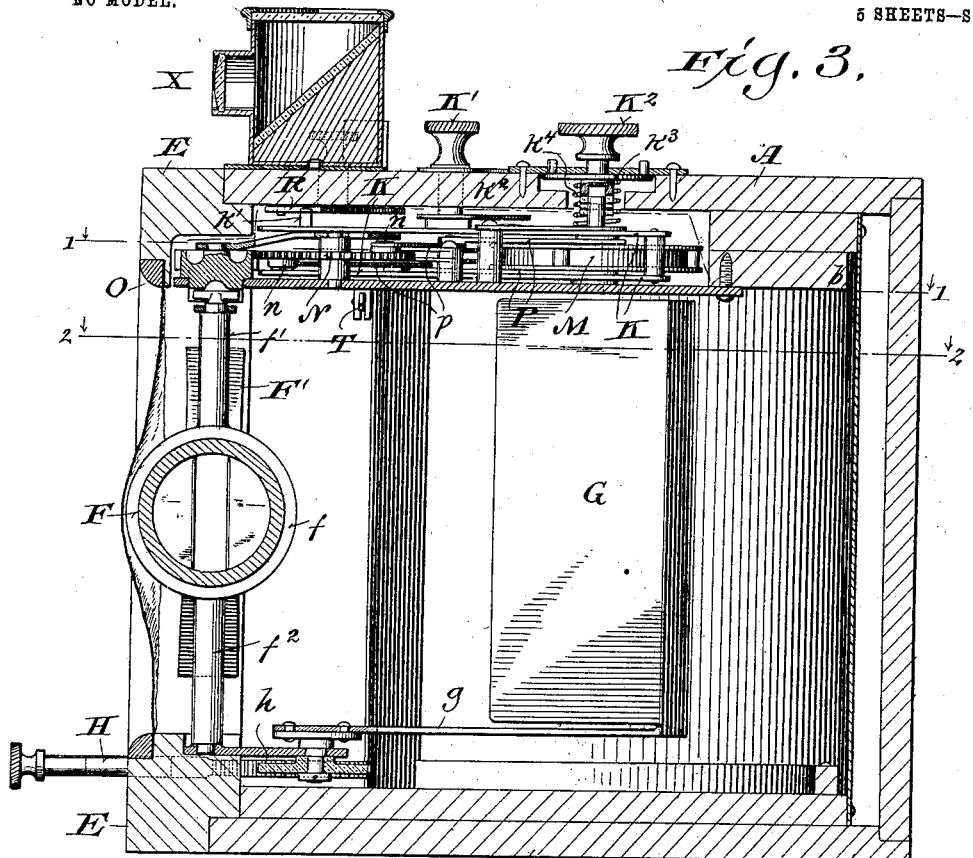
Figure 9:
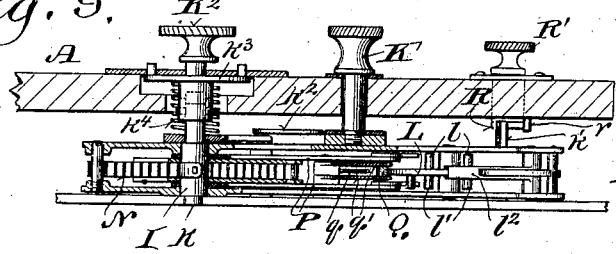
Figure 10:
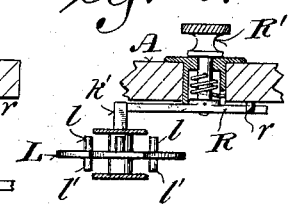
Figure 11:
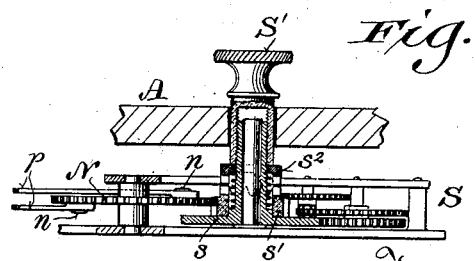
Figure 7:
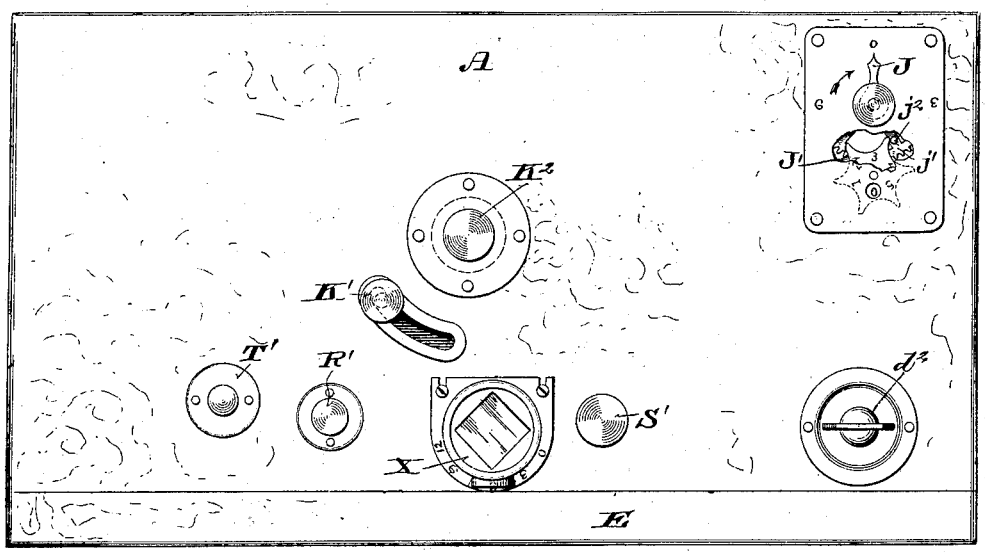
Figure 8:
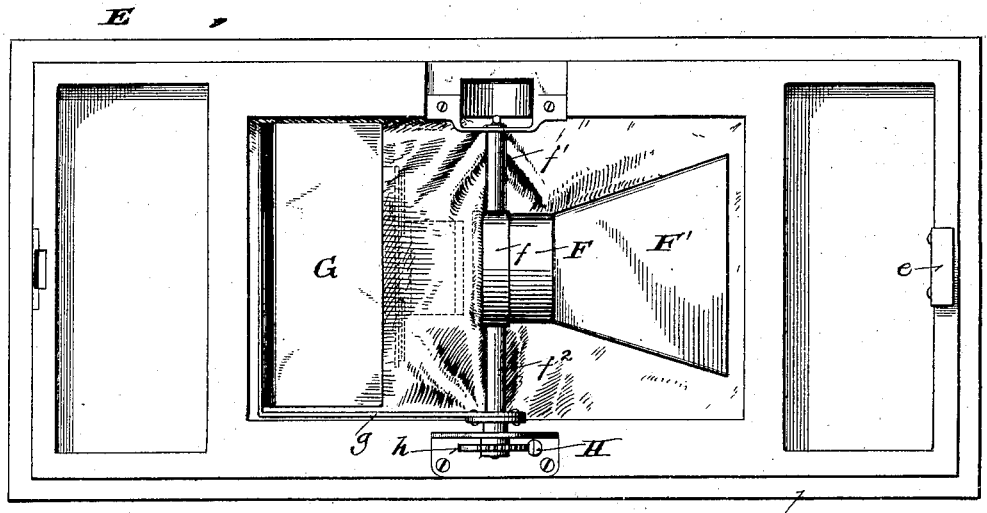

Figure 1 is a horizontal section (indicated on Fig. 3 by the line 1 1) through the upper part of the camera, showing in plan view the mechanism for operating the lens-holder. Fig. 2 is a similar section (indicated on Fig. 3 by the line 2 2) showing the adjustable stop and screen for limiting the movement of the lens-holder. Fig. 3 is a vertical section. (Indicated on Fig. 1 by the line 3 3.) Fig. 4 is a horizontal section and plan view of a portion of the lens-operating mechanism. Fig. 5 is a front elevation showing one of the spool-holders and the punch for perforating the film, the front of the case being removed and certain parts broken away and shown in section. Fig. 6 is a vertical section (indicated by the line 6 6, Fig. 1) showing the indicator for determining the length of film unwound for an exposure. Fig. 7 is a top or plan view of the camera on a reduced scale. Fig. 8 is a reverse view of the front of the camera, showing the lens-holder and adjustable stop. Fig. 9 is a vertical section (indicated by the line 9 9, Fig. 1) of the lens-operating mechanism. Fig. 10 is a similar section (indicated by the line 10 10, Fig. 1) of the detent and releasing device for said mechanism, and Fig. 11 is a vertical section (indicated by the line 11 11, Fig. 1) of the speed-checking train and the device for connecting and disconnecting it with the mechanism for operating the lens-holder.

A designates the case, which is provided with a curved film-support B and curved guides $b\ b$ for holding the film between the spools in proper position for an exposure. At the ends of said curved support the case is provided with spool-holders C C', which are furnished with wings $c\ c$, hinged to upright rods and pressed normally toward the spools by springs $c'\ c'$ to give the proper tension to the film and hold the same snugly wound upon said spools.

D D' are spools to which the ends of the film are attached. The spool D, upon which the unexposed film is wound, turns on a spindle $d$, loosely inserted at its ends in obliquely-arranged slots in the upper and lower ends of the spool-holder C, as shown in Figs. 2 and 5. The spool D', upon which the film is wound after being exposed, is held on a spindle $d'$, which is inserted through an opening in the top of the case and is provided at its upper end with a button $d^2$, as shown in Fig. 7, for winding the film upon the spool D'.

E is the front or lens frame, detachably secured by fastenings $e\ e'$, as shown in Fig. 1, to the case A, the fastening $e'$ being a spring-catch adapted to be disengaged from the removable front by a push-button $e^2$.

The lens-holder, consisting of a tube or barrel F, is inserted and held in a ring $f$, formed or provided, as shown in Figs. 2, 3, and 8, on opposite sides with spindles $f'\ f^2$, which are supported by and adapted to turn in bearings in the removable front E concentrically with the curved film-support B. The opening in the front around the lens-holder is closed against passage of light by some suitable flexible material, such as leather or opaque cloth, which is attached at its edges to the lens-barrel and to said front, sufficient slack being provided to allow the lens-holder to turn freely through an arc of about one hundred and eighty degrees.

F' is a narrow rearwardly-diverging shield attached at its smaller end to the inner end of the lens-barrel for concentrating the rays of light passing through the lens upon the film.

G is an adjustable stop and screen adapted to limit the movement of the shield and lens-holder and to intercept the rays of light passing through them in their final position. It is formed or provided with and carried by an arm $g$, which is pivoted to the case A or the front E as close as practicable to and parallel with the spindle $f^2$ of the lens-holder.

H is a push-rod passing through an opening in the front E and formed or provided with a rack, which engages with a pinion $h$, attached to the pivot-pin of the arm $g$, as shown in Figs. 2, 3, and 8. By this means the stop G is adjusted to limit the movement of the lens-holder and to intercept the light passing through it at any desired point. The rod H is graduated, as indicated in Fig. 2, to determine the position of the stop G, so that it may be readily and accurately set for making pictures of any desired length.

Referring to Figs. 1, 2, 6, and 7, showing the mechanism for indicating and determining the length of film unwound from the spool D for making a picture of any desired size, I is a friction-wheel mounted on the lower end of a vertical shaft $i$ and projecting at its periphery through an opening in the film-support B against the lower curved guide $b$. The lower end of the shaft $i$ bears in a pivoted arm $i'$, which is yieldingly pressed toward the guide $b$ by a spring $i^2$. The upper end of said shaft, which has a bearing in the top of the case A, is provided with a pinion $j$, which meshes with a gear $j'$, fixed to the lower end of a spindle passing upwardly through a plate attached to the top of the camera and provided on the upper side of said plate with an index or pointer J. J' is a toothed index or register wheel journaled on the under side of said plate and provided with a series of figures which are exposed one at a time through an opening in said plate, as shown in Fig. 7, and register the length of film unwound from the spool D. The indicator mechanism, as shown in the drawings, is constructed and arranged to produce one complete revolution of the pointer J when sufficient film is unwound for a picture of the greatest length the camera is designed to make—say twelve inches. The scale over which said pointer sweeps is graduated and numbered to indicate intermediate lengths varying by three inches, and the register-wheel A', which is turned an interval to each revolution of the pointer J by a pin $j^2$ on the gear $j'$, is numbered to register the number of twelve-inch exposures or full-size pictures made. It may be preferable, however, to so arrange the indicator mechanism that the register-wheel J' will designate the length of film unwound in inches instead of the number of full-length pictures, as it would avoid computation and confusion when pictures of different lengths were made on the same film.

Referring to Fig. 1, illustrating the mechanism for turning the lens-holder in either direction according to the position in which it stops after making an exposure, K is a lever pivoted near one end on a pin $k$, which has bearings above and below said lever in suitable frame-plates, as clearly shown in Fig. 9. This lever is preferably constructed of two parallel plates or bars, between which is carried a ratchet-wheel L in the longer arm of said lever.

M is a coil-spring attached at one end to the pivot-pin $k$ and at the other end to a cross-pin in the shorter arm of said lever and tending to move the opposite end of said lever forward toward the lens-holder. The ratchet-wheel is provided on opposite sides with alternating pins or projections $l\ l'$, corresponding in number and arrangement with the teeth of the ratchet-wheel. A pawl $l^2$, pivoted to the lever K and held by a spring in engagement with said ratchet-wheel, prevents its backward rotation.

N is a crank-wheel provided on opposite sides with crank-pins $n\ n$ and meshing with a pinion O, one journal of which projects through the lower frame-plate, as shown in Fig. 3, into position and is transversely slotted to engage with a cross-piece on the upper end of the spindle $f'$ of the lens-holder. The crank-pins $n\ n$ of the gear N are connected by links $p\ p$ with arms P P, which are pivoted on the pin $k$ above and below the spring M. The links $p\ p$ are formed with projections $p'\ p'$, which are arranged in the path of and are adapted to be engaged alternately by the pins or projections $l\ l'$ on the ratchet-wheel L.

Q is a pawl arranged between and pivoted to curved plates $q\ q$, passing between the parts of the lever K and supported at the ends concentrically with the fulcrum of said lever by posts attached to the lower frame-plate. It is yieldingly pressed outward and held normally in position by a spring $q'$, as shown in Fig. 4, to engage with the teeth of said ratchet-wheel as the lever K is withdrawn to its initial position, as shown in Fig. 1.

R is a detent adapted to engage with a pin or projection $k'$ on the lever K and hold said lever against the tension of spring M in its initial position. This detent is fixed upon the inner end of a pivot-stem which passes through the top of the case A and is provided outside thereof with a button R', as shown in Fig. 10. A spring coiled around said stem and attached thereto at one end and to the case at the other holds said detent normally against the stop $r$ in position to engage with the pin $k'$ on lever K. A pin K', attached to the lever K, passes through a curved slot in the top of the case A, as shown in Figs. 7 and 9, and is provided at its outer end with a button for resetting said lever and straining the spring M after each exposure. The slot in said case through which said pin projects is closed on the inside by a plate $k^2$, carried by said lever. A button $K^2$, having an axially-bored and transversely-slotted stem engaging with the upper end of the pivot-pin $k$ and with a cross-pin in said pivot-pin, serves to vary the tension of the spring M by winding it up more or less upon said pivot-pin. Said button and pivot-pin are held in adjusted position by a disk $k^3$, fixed on the shank of said button and provided on its upper side with one or more projections which are held normally by a spring $k^4$ in engagement with a perforated plate through which said shank passes and which is attached to the top of the camera, as shown in Figs. 3 and 9.

S designates a speed checking or retarding train of gears adapted to be connected with the lens-operating mechanism for making time exposures. Upon the hub of a gear $s$ of this train is loosely mounted a pinion $s'$, which meshes with the gear N, as shown in Figs. 1 and 11. The hub of the pinion $s'$ is formed with one member of a clutch, the other member $s^2$ of the clutch being loosely mounted upon the upwardly-extended hub of the gear $s$ and held normally out of engagement with the pinion $s'$ by a spring.

S' is a button having a tubular stem which passes through the top of the camera and is threaded upon the hub of the gear $s$ and abuts at its lower end against the clutch member $s^2$. By screwing the button S' down upon the clutch member $s^2$ it is forced into engagement with the clutch member on the pinion $s'$, thereby locking said pinion to the gear $s$, so that the speed-retarding train S will be driven by the gear N.

T is an angular film-perforating punch or lever fulcrumed at its elbow to the spool-holder C, as shown in Fig. 5. Its downwardly-projecting arm is bent substantially at right angles toward the film-support B and is pointed at the end, said film-support being perforated, as shown in Fig. 1, to receive it. The other horizontally-disposed arm of said lever is pivotally connected with the stem of a push-button T', which passes through the top of the camera and is normally held up by a spring $t$.

X is a finder pivotally mounted upon the camera, as shown in Figs. 3 and 7, and capable of an angular movement corresponding with that of the lens-holder. It is provided with a scale, as shown in Fig. 7, to determine its position and the extent of its angular movement, according to the extent of the angular movement or sweep that is to be made by the lens-holder in taking a picture.

My improved camera operates as follows: The camera being supplied with spools and the film adjusted, as shown in Fig. 1, and the parts of the camera being in the positions shown in that figure, to take a picture the film is wound from the spool D upon the spool D' by means of the button $d^2$ until a sufficient length of film, as indicated by the pointer J or register or index wheel J', is unrolled for a picture of the desired extent. If the camera is made to take pictures of a maximum length of twelve inches and the stop G is set at its extreme limit to the right, twelve inches of film will be unrolled. To facilitate setting the camera, the finder is turned on its pivot and caused to describe an arc corresponding with that through which the lens-holder is to be turned in making the picture. This operation may be repeated and the camera shifted until the desired view is brought within its range. The shutter is then opened, the light passing through the lens being intercepted by an inwardly-extending wall of the front E, as shown in Figs. 1 and 2. The detent R is then turned by the button R' out of engagement with the pin $k'$, thereby releasing the lever K, which is thereupon thrown forward by the spring M. One of the pins $l'$ on the lower side of the ratchet-wheel L being in the required position therefor engages with the projection $p'$ on the lower link $p$ and through said link turns the gear N to the left a part of a revolution, thereby turning the pinion O and the lens-holder to the right until its movement is arrested by the shield F' coming in contact with the stop G. In this operation of the mechanism the upper link $p$ and the pivoted arm P, with which it is connected, are carried back into a position corresponding with the initial position of the lower link and arm, as shown in Fig. 1. As the inner end of the shield F' comes in contact with the stop G the light passing through it is intercepted by said stop, which serves also as a screen, thus preventing the fogging of the film before the shutter can be closed. The push-button T' is then depressed, causing the punch T to perforate the film between the exposed and unexposed parts thereof. The lever K is withdrawn to its initial position by means of the button K', and the tension of the spring M, which has been slightly reduced by the preceding operation, is thus restored. As the pin $k'$ passes by the rear end of the detent R said detent is thrown by the spring on its pivot-stem against the stop $r$ into position to hold the lever K in its initial position. Another twelve-inch length of film being unwound, the camera is now ready to make another picture of the maximum width or length. In returning the lever K to its initial position the ratchet-wheel is engaged by the pawl Q and turned thereby, so as to bring the next pin $l$ on its upper side into position to engage with the projection $p'$ on the upper link $p$. When said lever is next released, it will consequently act through the upper link $p$ to turn the wheel N back to the right a part of a revolution, thus turning the lens-holder back to its original position at the left. Suppose now that it is desired to take a picture of a less-extended view—for example, a picture six inches in length or width. The rod H is drawn out to the point marked 6, thus turning the stop G to the left into the position indicated by dotted lines in Fig. 2. The film is unwound to the extent of six inches, as indicated by the pointer J or index-wheel J', and the camera is set or adjusted by means of the finder till the desired view is brought within its reduced range. The lever K having been returned to its initial position is released, as above explained, and acting through the lower link $p$ turns the lens-holder to the right until it is arrested by the stop G. In case it is desired to make the next picture of a different length or width the stop G is adjusted accordingly, and a corresponding length of film is unrolled. After each exposure the film is perforated by the punch T, and before another exposure is made the requisite length of film has to be unrolled and the lever K returned to its initial position.

For instantaneous exposures the speed-retarding train S is disconnected by unscrewing the button S', which releases the clutch member $s^2$ from the pinion $s'$. The speed with which the lens-holder is turned may be regulated for instantaneous exposures by means of the button K, which serves to strain the spring M more or less as desired. For making time exposures the speed-retarding train S is connected with the lens-operating mechanism by screwing the button S' down upon the clutch member $s^2$ until the pinion $s'$ is locked with the gear $s$. The length of time exposures may be varied by varying the tension of the spring M in the manner above explained.

Various changes in the details of constructing and arranging the various parts of the camera may be made without materially affecting its operation or departing from the principle and intended scope of the invention.

The terms "right" and "left" as herein employed have reference to one facing the front of the camera.

I claim—

1. In a panoramic camera the combination with a suitable case having a curved film-support and a lens-holder adapted to swing on an axis concentric with said film-support, of spring-actuated mechanism adapted to turn said lens-holder alternately in opposite directions, and means for varying the tension of said actuating-spring, substantially as and for the purposes set forth.

2. In a panoramic camera the combination with a suitable case having a curved film-support and a swinging lens-holder adapted to turn on an axis concentric with said film-support, of a lever, a spring for actuating said lever, a detent for holding said lever in its initial position, means for manually releasing said lever, cranks arranged to turn the lens-holder and two pivoted arms connected by links with said cranks and arranged to be turned alternately forward and backward by the advance of said lever, substantially as and for the purposes set forth.

3. In a panoramic camera the combination with an oscillatory lens-holder, of a lever, a spring for actuating said lever, cranks connected with and adapted to swing the lens-holder, two pivoted arms connected by links with said cranks, a wheel carried by said lever and having alternating projections on opposite sides for actuating said arms and links alternately in opposite directions, and a pawl arranged to turn said wheel and bring another projection thereon into operative position each time said lever is returned to its initial position, substantially as and for the purposes set forth.

4. In a panoramic camera the combination with an oscillatory lens-holder, of mechanism constructed and arranged to turn said lens-holder alternately in opposite directions, means for manually resetting and releasing said mechanism, a speed-retarding train and means for connecting and disconnecting said train with the lens-actuating mechanism, substantially as and for the purposes set forth.

5. In a panoramic camera the combination with an oscillatory lens-holder, of mechanism constructed and arranged to turn said lens-holder alternately in opposite directions and comprising an actuating-spring and means for varying the tension of said spring, substantially as and for the purposes set forth.

6. In a panoramic camera the combination with an oscillatory lens-holder, of a lever connected by reversing mechanism with said lens-holder, a coiled spring attached at its outer end to said lever and at its inner end to the pivot-post of said lever, a button for turning said post and adjusting the tension of said spring and means for holding said post in adjusted position, substantially as and for the purposes set forth.

7. In a panoramic camera the combination with a suitable case having a curved film-support and a removable front, of an oscillatory lens-holder having a spindle journaled in said front transversely to the axis of the lens, and mechanism for turning said lens-holder inclosed in said case and having a detachable driving connection which engages with said spindle when the front is applied to the case, substantially as and for the purposes set forth.

8. In a panoramic camera, the combination with a suitable case having a curved film-support therein, and a lens-holder pivoted in the wall of the case to swing on an axis concentric with said film-support, of an adjustable stop for limiting the movement of said lens-holder.

9. In a panoramic camera, the combination with a suitable case having a curved film-support therein, and a lens-holder pivoted in the wall of the case to swing on an axis concentric with said film-support, of an adjustable stop for limiting the movement of said lens-holder, and means for determining outside the camera the point at which the stop is set to arrest the holder.

10. In a panoramic camera the combination with an oscillatory lens-holder, of an adjustable stop and screen for limiting the movement of said lens-holder and intercepting the light passing through the lens in its final position, substantially as and for the purposes set forth.

11. In a panoramic camera the combination with an oscillatory lens-holder provided at its inner end with a shield for concentrating the light on the negative, of a stop and screen carried by a pivoted arm which is provided with a gear concentric with its pivot and a graduated rack engaging with said gear for setting said stop and screen in different positions, substantially as and for the purposes set forth.

12. In a panoramic camera the combination with an oscillatory lens-holder, of an adjustable stop for limiting the movement of said lens-holder, means for setting said stop in the desired position, and an indicator for determining the length of film unwound, substantially as and for the purposes set forth.

13. In a panoramic camera the combination with a suitable case having a curved film-support and an oscillatory lens-holder adapted to swing on an axis concentric with said film-support, of a screen located between the lens and film-support adapted to cut off light passing through the lens at different points in the path of the lens-holder, substantially as and for the purposes set forth.

14. In a panoramic camera the combination with a suitable case having a curved film-support and an oscillatory lens-holder adapted to swing in an axis concentric with said film-support, of a screen located between the lens and film-support adapted to cut off light passing through the lens at different points in the path of the lens-holder, and means for determining outside of the camera the point at which the device is set to cut off the light through the lens, substantially as and for the purposes set forth.

15. In a panoramic camera, the combination with an oscillatory lens-holder, of a speed-retarding mechanism, capable of being connected with or disconnected from said holder for time or instantaneous exposures and means for varying the speed of the holder.

In witness whereof I hereto affix my signature in presence of two witnesses.

CHARLES WM. SCHOBER.

Witnesses:
 G. C. RASCH,
 CHAS. L. GOSS.